United States Patent
Mössner

(10) Patent No.: US 10,222,772 B2
(45) Date of Patent: Mar. 5, 2019

(54) METHOD AND CONFIGURATION SYSTEM FOR CONFIGURING HARDWARE MODULES IN AN AUTOMATION SYSTEM

(71) Applicant: Siemens Aktiengesellschaft, Munich (DE)

(72) Inventor: Rudolf Mössner, Burglengenfeld (DE)

(73) Assignee: Siemens Aktiengesellschaft, Munich (DE)

( * ) Notice: Subject to any disclaimer, the term of this patent is extended or adjusted under 35 U.S.C. 154(b) by 275 days.

(21) Appl. No.: 15/200,831

(22) Filed: Jul. 1, 2016

(65) Prior Publication Data
US 2017/0010596 A1    Jan. 12, 2017

(30) Foreign Application Priority Data
Jul. 8, 2015 (EP) .................................... 15175811

(51) Int. Cl.
G05B 19/042        (2006.01)
G05B 19/418        (2006.01)
G06F 8/71          (2018.01)

(52) U.S. Cl.
CPC ..... *G05B 19/042* (2013.01); *G05B 19/41845* (2013.01); *G05B 2219/21156* (2013.01);
(Continued)

(58) Field of Classification Search
CPC ............ G05B 19/042; G05B 19/41845; G05B 2219/25092; G05B 2219/21156;
(Continued)

(56) References Cited

U.S. PATENT DOCUMENTS 6,947,798 B2 *   9/2005   Bronikowski ..... G05B 19/0426
                                                    700/182
7,222,147 B1 *   5/2007   Black .................. H04L 41/0803
                                                    709/200
(Continued)

FOREIGN PATENT DOCUMENTS

CN       102301288       12/2011
CN       103155734       6/2013
(Continued)

OTHER PUBLICATIONS

Fisher N. et al: "Thermal-Aware Global Real-Time Scheduling on Multicore Systems"; Real-Time and Embedded Technology and Applications Symposium RTAS 2009; pp: 131-140.
(Continued)

*Primary Examiner* — Christopher E. Everett
(74) *Attorney, Agent, or Firm* — Cozen O'Connor

(57) ABSTRACT

A method for configuring hardware modules in an automation system includes the steps opening or creating a project in a project configuration software package, opening or generating, in the project, where a station has a number of slots, opening a hardware catalog that includes a plurality of hardware module master data records, inserting at least one hardware module master data record for a hardware module from the hardware catalog (into the station, wherein a customization step is performed for the at least one hardware module master data record, where at least one environmental parameter is specified which represents the ambient conditions at the deployment location of the at least one hardware module, and saving the station having the at least one hardware module master data record inserted into the station and with its at least one environmental parameter.

8 Claims, 4 Drawing Sheets

(52) U.S. Cl.
CPC .............. *G05B 2219/23227* (2013.01); *G05B 2219/25092* (2013.01); *G05B 2219/33125* (2013.01); *G06F 8/71* (2013.01); *Y02P 90/16* (2015.11); *Y02P 90/185* (2015.11)

(58) Field of Classification Search
CPC ........... G05B 2219/33125; G05B 2219/23227; Y02P 90/185; Y02P 90/16; G06F 8/71
See application file for complete search history.

(56) References Cited

U.S. PATENT DOCUMENTS

| | | | |
|---|---|---|---|
| 2004/0237065 A1 | 11/2004 | Brousek et al. | |
| 2005/0273542 A1* | 12/2005 | Valmiki | G06F 15/7864 710/306 |
| 2005/0289365 A1* | 12/2005 | Bhandarkar | G06F 1/3203 713/300 |
| 2006/0206860 A1 | 9/2006 | Dardinski et al. | |
| 2006/0206866 A1* | 9/2006 | Eldrige | G05B 15/02 717/122 |
| 2008/0028244 A1* | 1/2008 | Capps | G06F 1/206 713/324 |
| 2010/0050097 A1* | 2/2010 | McGreevy | G05B 19/409 715/762 |
| 2010/0082119 A1* | 4/2010 | Case | G05B 19/4188 700/28 |
| 2010/0114385 A1 | 5/2010 | Dempster et al. | |
| 2012/0066535 A1 | 3/2012 | Naffziger | |
| 2013/0096695 A1 | 4/2013 | Meyer | |
| 2014/0039852 A1 | 2/2014 | Zhang et al. | |
| 2014/0244231 A1 | 8/2014 | Paule et al. | |

FOREIGN PATENT DOCUMENTS

| | | |
|---|---|---|
| CN | 103201703 | 7/2013 |
| CN | 104007752 | 8/2014 |
| EP | 1 480 092 | 12/2008 |
| WO | WO 00/70417 | 11/2000 |

OTHER PUBLICATIONS

Office Action dated Dec. 18, 2018 issued in Chinese Patent Application No. 201610517951.5.

* cited by examiner

METHOD AND CONFIGURATION SYSTEM FOR CONFIGURING HARDWARE MODULES IN AN AUTOMATION SYSTEM

BACKGROUND OF THE INVENTION

1. Field of the Invention

The invention relates to configuration systems and, more particularly, to a method for configuring hardware modules in an automation system, comprising opening or creating a project in a project configuration software package, opening or generating, in the project, a station having a number of slots, opening a hardware catalog comprising a plurality of hardware module master data records, and inserting at least one hardware module master data record for a hardware module from the hardware catalog into the station.

2. Description of the Related Art

Automation systems have one or more interconnected stations. Each of the stations preferably has a modular construction and can comprise different hardware modules. As a general rule, the hardware modules form the smallest unit of the automation system and are combined in a hardware catalog for a plant commissioning engineer. In the catalog, each hardware module is assigned an order number, for example. The project management and configuration of hardware modules in the automation system can be performed, for example, by a project configuration software package, such as Step 7 from Siemens, for example. This means that after the project configuration software package is called a corresponding user interface is opened. A project is then generated for the plant to be automated, for the machine or for each station. The hardware modules are then configured in this project, in other words, a slot in the station is assigned to the hardware modules to be parameterized. Following successful configuration and parameterization, this configuration is saved and loaded into the automation system. The corresponding methodology is known, for example, from the "Einführung in den SIMATIC-Manager" (Introduction to the SIMATIC Manager) by Walter, 14.05.2003.

EP 1 480 092 B1 also discloses a method for project management of an automation system.

Special requirements apply to the technology employed for hardware modules in the automation technology sector. The hardware modules are normally installed directly in a production environment, for example in control cabinets or directly on a machine.

On account of the deployment location of the hardware modules, special requirements exist, for example, with respect to electromagnetic compatibility, shock, vibrations, as are also described inter alia in International Electrotechnical Commission (IEC) standard 61131-2. It has furthermore become established as a quality standard that automation components or the hardware modules are capable of being used at high ambient temperatures up to 60° C. or even 65° C. On account of the harsh industrial environment, free convection cooling is resorted to as a general rule for heat dissipation from the hardware modules because built-in fans in the device tend, on the one hand, to suffer from soiling and, on the other hand, significantly reduce the MTBF of the devices. In addition to the high ambient temperatures and the requirement for passive cooling, the requirements relating to shock and vibration also render the design of the cooling for powerful electronic components considerably more difficult in the industrial environment.

Electrical and electronic components built into the hardware modules, such as for a multi-core processor system, are frequently only specified up to ambient temperatures of 85° C. or housing temperatures of less than 100° C. Accordingly, on account of the high ambient temperatures permitted in industrial environments only slight temperature differences from the specified maximum temperatures of the components used are therefore available. A maximum permissible power loss in the system is thereby also greatly limited. A limitation of the maximum permissible power loss directly limits the available computing power of the processor system employed in each case or of the entire hardware module.

From the product world of personal computers, it is known to dynamically customize the computing power of a system to the currently prevailing conditions. These methods referred to, for example, as turbo modes, on the one hand, or as throttling, on the other hand, are employed, for example, with laptops and other mobile devices.

With this known method it is, however, disadvantageous that these methods result in considerable fluctuations in the available computing power depending on the currently prevailing conditions. Such types of methods are not as a rule suitable for hardware modules in the automation technology sector because a constant computing power and therewith a stable cycle time or constant response times for the production process are of vital importance for the applications running in the hardware modules.

Hardware modules for the automation technology sector are, as a rule, currently designed such that with respect to a processor clock, the number of processor cores used and the memories used can be reliably cooled in the event of maximum guaranteed ambient conditions. At lower ambient temperatures and therewith a higher permissible power loss the hardware modules could be operated at a considerably higher performance level.

A dynamic customization of the computing power based on the currently prevailing ambient conditions is not performed in the case of industrial modules. This is intended to avoid the situation in which the computing power of the hardware module, and thus also of the production process to be automated, is not influenced by the ambient conditions and problems are therefore avoided in the production process.

A maximum achievable computing power of the hardware module or of an automation component employed is therefore influenced essentially by the maximum guaranteed ambient temperature. Even a slight reduction in the maximum ambient temperature for a particular application enables a significant increase in the computing power of the hardware module.

SUMMARY OF THE INVENTION

In view of the foregoing, it is therefore an object of the present to increase the computing power of hardware modules in the automation technology sector without having a negative influence on reproducibility when a program is executed under dynamically changing ambient conditions (temperature). The foregoing object should, however, be achieved without an increase in the production costs of hardware modules that are implemented through additional complex heat dissipation measures.

These and other objects and advantages are achieved in accordance with the invention by providing a method in which in addition to project management steps, a customization step for the at least one hardware module master data record is performed, where at least one environmental parameter is specified that represents the ambient conditions at the deployment location of the at least one hardware module, where in a subsequent save step the station having the at least one hardware module master data record inserted into the station and its at least one changed environmental parameter is saved in the new configuration in the automation system and onto a hard disk.

The automation components or the hardware modules are as a rule designed for very high ambient temperatures and passive cooling. As a result, with respect to their maximum power loss and their maximum processor clock they are configured for the maximum ambient temperatures. This is a maximum temperature value of, for example, 60° C., for which the hardware modules are designed in the as-delivered state. There may, however, also be applications in which the maximum ambient temperature is not reached.

In order to limit the variance in a range of modules, as a rule, manufacturers do not as a rule produce module variants having finely graduated ambient temperature classes. The present inventor has recognized that it makes good sense to introduce into a parameterization range of the automation system or of the automation stations configuration parameters that specify the ambient conditions at a deployment location. The entry of additional configuration parameters accordingly constitutes part of a configuration and project management method for hardware modules in an automation system. The parameterization is normally performed in a parameterization interface of an engineering system.

By preference, a maximum temperature value for an ambient temperature parameter defined in the as-delivered state of the hardware module is changed in the direction of lower temperature values in the customization step. The method, the project configuration software package or the engineering system used now has a program component for module configuration in respect of an ambient temperature. By choosing a lower maximum ambient temperature, it is possible, for example, to increase a processor clock rate as a function of the ambient temperature. The storage of the temperature information for a particular application of the hardware module remains in the configuration file of the project for the automation system. Although the maximum ambient temperature thus specified by a user for an automation component or for the individual hardware module is retained in a default as-delivered state, it can however be customized for the respective plant configuration.

A further optimization of the method provides that in addition to the at least one ambient temperature a configuration is set and saved for the number of processor cores to be operated in the case of a multi-core processor.

In order to further facilitate the project management of the hardware modules for the automation system for a user of an engineering system or a commissioning engineer, based on the currently configured ambient temperature parameter and a stored hardware-module-specific heat dissipation table a configuration that gives the number of processor cores to be operated in the case of a multi-core processor is automatically chosen when the automation system is started up or in the event of a change in the parameterization. As a result, the hardware modules offer the best possible computing power for the currently specified ambient temperature parameter and nevertheless are reliably cooled on account of the ambient conditions at the deployment location. For this purpose, a user of the project configuration software package needs no detailed knowledge of the hardware modules used. The user must merely ensure that the ambient temperature into which he is introducing the projected hardware module does not exceed the parameterized temperature value.

In order to further facilitate the project management for a user or a commissioning engineer, in addition to the project configuration software package the customization step can also be performed from a web server or an operating panel directly on the hardware module.

It is also an object of the invention to provide a configuration system for configuring hardware modules in an automation system designed using a project configuration software package having a creation tool for creating a project, generation tool for generating a station having a number of slots, a hardware catalog comprises a plurality of hardware module master data records, an insertion tool for inserting at least one hardware module master data record for a hardware module from the hardware catalog into the station, a customization tool for customizing the at least one hardware module, where the customization tool is configured to customize at least one environmental parameter that represents the ambient conditions at the deployment location of the at least one hardware module, and a storage tool for saving the station with the at least one hardware module master data record inserted into the station and its at least one customized environmental parameter.

To enable user-friendly modification of the environmental parameters, the customization tool has a parameterization interface that is configured to display a maximum temperature value specified in an as-delivered state of the hardware module, where an input tool for an ambient temperature parameter is configured within the parameterization interface to change the ambient temperature parameter in the direction of lower temperature values while preventing the maximum temperature value from being exceeded.

With regard to a computing power of the hardware modules to be customized, the configuration system is further enhanced in that the parameterization interface has a configuration tool which is configured to set and to save a configuration for the number of processor cores to be operated in the case of a multi-core processor.

In a further embodiment of the configuration system, an optimization tool that is configured based on the currently configured ambient temperature parameters and a stored hardware-module-specific heat dissipation table to automatically make available, when the automation system is started up or in the event of a change in the parameterization, a configuration that gives the number of processor cores to be operated in the case of a multi-core processor and with which the hardware modules offer the best possible computing power for the currently specified ambient temperature parameter and nevertheless are reliably cooled on account of the ambient conditions at the deployment location.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of the invention, in which.

DETAILED DESCRIPTION OF THE EXEMPLARY EMBODIMENTS

Figure 1:
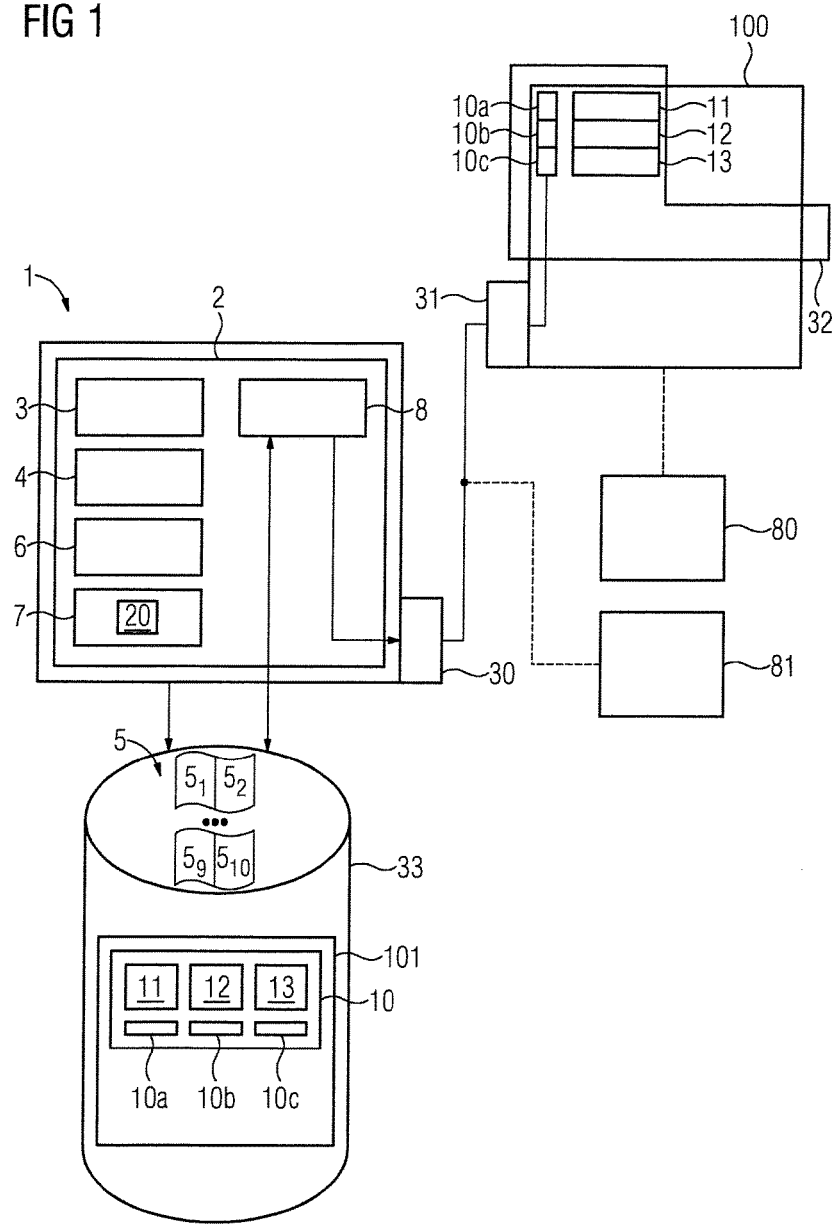
FIG. 1 shows a configuration system for configuring an automation system in accordance with the invention.

FIG. 1 illustrates a configuration system 1 for configuring hardware modules 11,12,13 in an automation system 100. The configuration system 1 is configured, for example, as an industrial computer and has a project configuration software package 2. The project configuration software package 2 is subdivided into different software components, comprising a creation tool 3 for creating a project 101, a generation tool 4 for generating a station 10 having a number of slots 10a,10b,10c, an insertion tool 6 for inserting a hardware module master data record 51, . . . ,510 for a hardware module 11,12,13 from a hardware catalog into the station 10.

In order to configure the automation system 100, after the project configuration software package 2 has been started an existing project 101 must be opened or a new project generated. In an interface that subsequently appears, either the already existing project 101 can be opened or a new project can be created. Within the project 101, a station 10 is then to be created or an already existing station 10 is to be opened. The opened station 10 is then displayed on the interface in a separate window, for example, as is known from Windows interfaces. In addition, the slots 10a,10b,10c available for the station 10 are displayed in the window. A first hardware module 11 can be parameterized or inserted onto the first slot 10a, a second hardware module 12 onto the second slot 10b and a third hardware module 13 onto the third slot 10c.

With the customization tool 7, the hardware module master data records 51, . . . ,510 associated with the hardware modules 11,12,13 can be customized from the hardware catalog 5. A first hardware module master data record 51 is assigned to the first hardware module 11, a second hardware module master data record 52 to the second hardware module 12 and a third hardware module master data record 53 to the third hardware module 13.

With the customization tool 7, a maximum temperature value for an ambient temperature parameter defined in the as-delivered state of the hardware modules 11,12,13 can be changed in the direction of lower temperature values T1,T2,T3,T4 (see FIG. 2) in the customization step.

When the configuration of the hardware modules 11,12,13 has been completed for the automation system 100, on the one hand, the project 101 with its station 10 is then saved in a data storage unit 33, for example a hard disk and, on the other hand, the project 101 with its station 10 is saved as a configuration file for the automation system 100 in the hardware modules 11,12,13 or in a central component via an interface 30 that is connected by way of a field bus to a counter-interface 31 of the automation system 100.

A storage tool 8 provides for secure storage in the data storage unit 33 or in the automation system 100.

In an as-delivered state of the hardware modules 11,12,13, a maximum temperature value is defined for an ambient temperature at the deployment location of the modules, which is specified with a default value of 65° C. Since in this particular case the automation system 100 is operated in part in an air-conditioned control cabinet 32, where in particular the first hardware module 11, the second hardware module 12 and the third hardware module 13 are situated in the air-conditioned control cabinet 32, this ensures that a maximum ambient temperature in the air-conditioned control cabinet 32 of 45° C. is not exceeded.

In view of the fact that the automation system 100, in particular the hardware modules 11,12,13 employed, are deployed in the air-conditioned control cabinet 33 and the ambient temperature in the air-conditioned control cabinet 33 does not exceed 45° C., a commissioning engineer or project engineer of an automation system 100 can advantageously use the customization tool 7, which has a parameterization interface 70, to customize an ambient temperature parameter 20.

Figure 2:
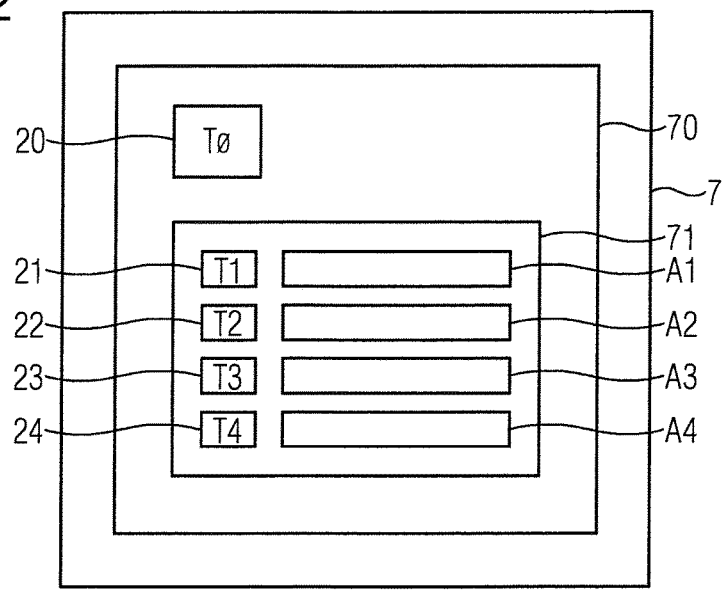
FIG. 2 shows a customization tool having a parameterization interface in accordance with the invention.

FIG. 2 shows the customization tool 7 with its parameterization interface 70. Temperature value T0=65° C. defined in an as-delivered state of a hardware module 11,12,13 is displayed. The as-delivered state temperature value T0 can optionally be customized via an input tool 71 to a first temperature value 21, T1=60° C., a second temperature value 22, T2=55° C., a third temperature value 23, T3=50° C. or a fourth temperature value 24, T4=45° C. For the information of the commissioning engineer or the project engineer, in addition to the displays for the temperature values 21, . . . ,24, corresponding output fields A1,A2,A3,A4 are displayed in the input tool 70. "Performance enhancement at T1=60° C. equals 10%" is displayed in a string in a first output field A1, "Performance enhancement at T2=55° C. equals 15%" is displayed in a string in a second output field A2, "Performance enhancement at T3=50° C. equals 30%" is displayed in a string in a third output field A3, and "Performance enhancement at T4=45° C. equals 50%" is displayed in a string in a fourth output field A4.

In the application described with respect to FIG. 1, with the knowledge that a maximum ambient temperature in the air-conditioned control cabinet 32 is 45° C. a commissioning engineer would now customize the ambient temperature parameter 20 of T0=65° C. to T4=45° C. in the input tool 71, thereby achieving a gain in computing power of 50% in his hardware modules or in a particular hardware module. This change made using the customization tool 7 is saved via the storage tool 8 in the project 101 or in the station 10. On account of its special deployment in an air-conditioned control cabinet 32 the automation system 100 configured in such a way can now be operated with its computing power increased by 50% compared with the maximum limited computing power in its as-delivered state.

Figure 3:
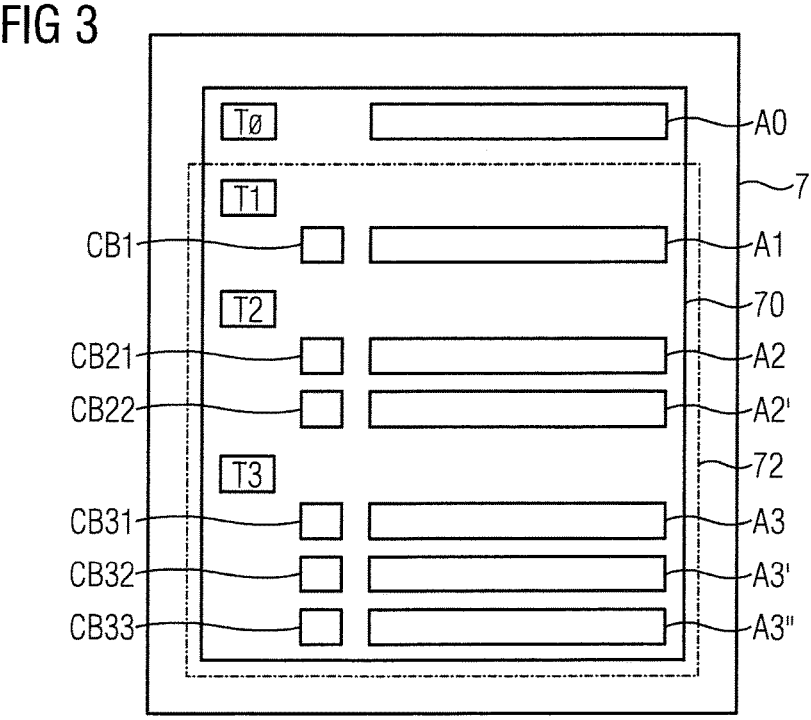
FIG. 3 shows a customization tool extended from that in FIG. 2 having an extended parameterization interface in accordance with the invention.

FIG. 3 illustrates a further simplification for configuration by the user. The customization tool 7 is now extended by its parameterization interface 70 such that it comprises a configuration tool 72, where in addition to the displays for different temperature levels T1,T2,T3 and the output fields further options for configuration via checkboxes CB1, . . . , CB33 are now available.

The user or commissioning engineer is now informed by way of output fields A1,A2,A3 not only what gain in performance is to be expected but on choosing temperature level T3 of 45° C. a further choice of three checkboxes CB31,CB32,CB33 is made available to him. A first checkbox CB31 can be selected for the case that "one active processor core should bring a performance enhancement of 50%". A second checkbox CB32 can be selected if "two active processor cores should bring a performance enhancement of 30% per core" and a third checkbox CB33 can be selected if "four active processor cores, where four cores should be operated with normal performance" are desired. This means that the parameterization interface 70 has a configuration tool 72 that is configured to set and save a configuration for the number of processor cores to be operated cases of a multi-core processor.

Figure 4:
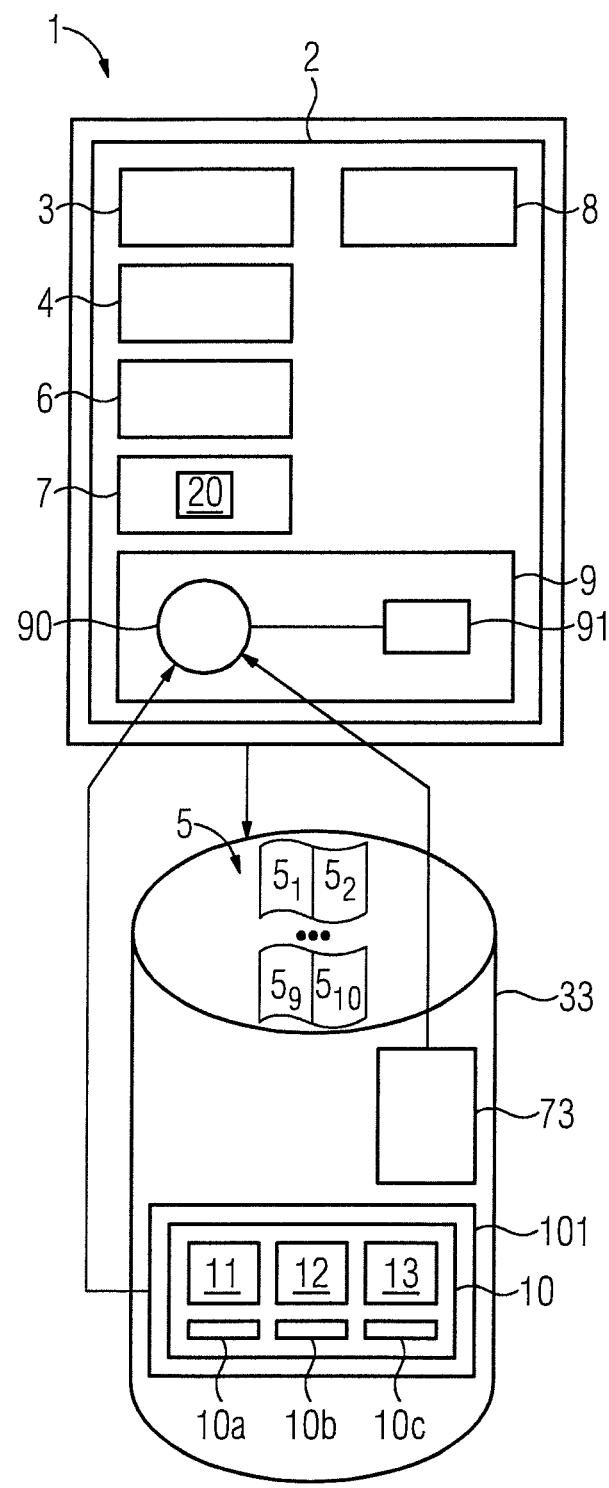
FIG. 4 shows a configuration system as is known from FIG. 1 having an extension of an optimization tool.

FIG. 4 illustrates the configuration system 1 of FIG. 1, but with an extension. The extension relates to an optimization tool 9, where the optimization tool 9 functions with an optimization calculation 90. The input variables used for the optimization calculation 90 are the configuration file from the project 101 and data from a module-specific heat dissipation table 73. The optimization tool 9 is configured to automatically provide, based on the currently configured ambient temperature parameter 20 and a stored hardware-module 11,12,13 specific heat dissipation table 73, a configuration that gives the number of processor cores to be operated in cases of a multi-core processor when the automation system 100 is started up or in the event of a change in the parameterization, and as a result of which the hardware modules 11,12,13 offer the best possible computing power for the currently specified ambient temperature parameter 20 and nevertheless are reliably cooled on account of the ambient conditions at the deployment location.

As an optional way to extend and facilitate the operability, FIG. 1 additionally shows a web server 80 by means of which, in addition to the project configuration software package 2 the customization step can be performed. The web server 80 is connected by way of a data line (dashed) to the field bus. It is also possible to carry out the customization step by means of an operating panel 81 connected to the automation system 100.

Figure 5:
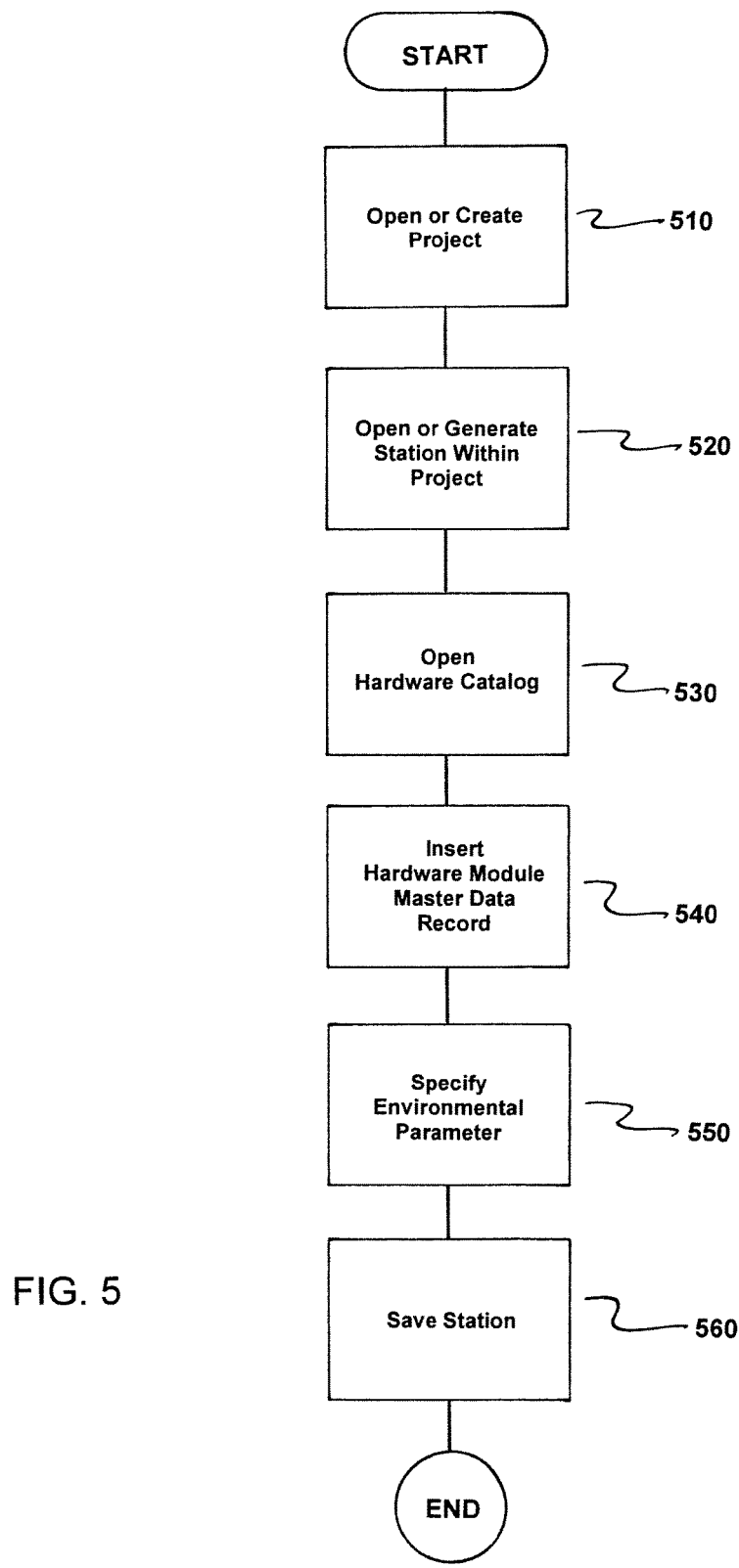
FIG. 5 is a flowchart of the method in accordance with the invention.

FIG. 5 is a flowchart of a method for configuring hardware modules in an automation system. The method comprises opening or creating a project in a project configuration software package, as indicated in step 510. Next, a station having a number of slots is opened or generated within the project, as indicated in step 520.

A hardware catalog comprising a plurality of hardware module master data records is now opened, as indicated in step 530. Next, at least one hardware module master data record for a hardware module from the hardware catalog is inserted into the station, as indicated in step 540.

At least one environmental parameter representing ambient conditions at a deployment location of the at least one hardware module is specified to provide customization for the at least one hardware module master data record, as indicated in step 550. Next, a station having the at least one hardware module master data record inserted into the station and with its at least one environmental parameter is now saved, as indicated in step 560.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring hardware modules in an automation system, comprising:
    a) opening or creating a project in a project configuration software package;
    b) opening or generating, within said project, a station having a number of slots;
    c) opening a hardware catalog comprising a plurality of hardware module master data records;
    d) inserting at least one hardware module master data record for a hardware module from the hardware catalog into the station;
    e) specifying at least one environmental parameter representing ambient conditions and a configuration for a number of processor cores to be operated in cases of a multi-core processor at a deployment location of the at least one hardware module to provide customization for the at least one hardware module master data record; and
    f) saving a station having the at least one hardware module master data record inserted into said station and with its at least one environmental parameter and its configuration for the number of processor cores to be operated in cases of the multi-core processor.

2. The method as claimed in claim 1, wherein said customization includes changing a maximum temperature value for an ambient temperature parameter defined in an as-delivered state of the hardware module in a direction of lower temperature values.

3. The method as claimed in claim 2, wherein, based on a currently configured ambient temperature parameter and a stored hardware-module specific heat dissipation table, a configuration which gives a number of processor cores to be operated cases of a multi-core processor is automatically chosen when the automation system is started up or in an event of a parameterization change such that the hardware modules offer a best possible computing power for a currently specified ambient temperature parameter and are reliably cooled on account of the ambient conditions at the irrespective of the deployment location.

4. The method as claimed in claim 1, wherein, based on a currently configured ambient temperature parameter and a stored hardware-module specific heat dissipation table, a configuration which gives a number of processor cores to be operated cases of a multi-core processor is automatically chosen when the automation system is started up or in an event of a parameterization change such that the hardware modules offer a best possible computing power for a currently specified ambient temperature parameter and are reliably cooled on account of the ambient conditions at the irrespective of the deployment location.

5. The method as claimed in claim 1, wherein said customization is performed from a web server or an operating panel directly on the hardware modules in addition to the project configuration software package.

6. A configuration system for configuring hardware modules in an automation system configured via a project configuration software package, comprising:
    a creation tool for creating a project;
    a generation tool for generating a station having a number of slots;
    a hardware catalog comprising a plurality of hardware module master data records;

an insertion tool for inserting at least one hardware module master data record for a hardware module from the hardware catalog into the station;

a customization tool for customizing the at least one hardware module, said customization tool including a parameterization interface having a configuration tool which is configured to set and save a configuration for a number of processor cores to be operated in cases of a multi-core processor, and said customization tool being configured to customize at least one environmental parameter which represents ambient conditions at a deployment location of the at least one hardware module; and a storage tool for saving the station with the at least one hardware module master data record inserted into the station and its at least one customized environmental parameter.

7. The configuration system as claimed in claim 6, wherein the parameterization interface is configured to display a maximum temperature value specified in an as-delivered state of the hardware module, wherein an input tool for an ambient temperature parameter is provided within the parameterization interface to change the ambient temperature parameter in a direction of lower temperature values while preventing a maximum temperature value from being exceeded.

8. The configuration system as claimed in claim 7, further comprising:

an optimization tool which is configured to automatically make available, based on a currently configured ambient temperature parameter and a stored hardware-module specific heat dissipation table, when the automation system is started up or in the event of a change in the parameterization, a configuration which gives a number of processor cores to be operated in cases of a multi-core processor and with which the hardware modules offer a best possible computing power for a currently specified ambient temperature parameter and are reliably cooled on account of the ambient conditions at the irrespective of the deployment location.

* * * * *